United States Patent
Takahara

(10) Patent No.: US 7,059,629 B2
(45) Date of Patent: Jun. 13, 2006

(54) WINDOW AIR BAG SYSTEM AND METHOD OF MOUNTING THE SAME

(75) Inventor: Isamu Takahara, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/478,003

(22) PCT Filed: Jun. 11, 2002

(86) PCT No.: PCT/IB02/02126

§ 371 (c)(1),
(2), (4) Date: Nov. 17, 2003

(87) PCT Pub. No.: WO02/100689

PCT Pub. Date: Dec. 19, 2002

(65) Prior Publication Data

US 2004/0130129 A1 Jul. 8, 2004

(30) Foreign Application Priority Data

Jun. 13, 2001 (JP) ............................. 2001-178328

(51) Int. Cl.
*B60R 21/22* (2006.01)
(52) U.S. Cl. .................................. 280/730.2
(58) Field of Classification Search ............. 280/730.2, 280/730.1, 728.1
See application file for complete search history.

(56) References Cited

U.S. PATENT DOCUMENTS

| | | | |
|---|---|---|---|
| 5,788,270 A | 8/1998 | Haland et al. | |
| 6,079,732 A * | 6/2000 | Nakajima et al. | 280/728.2 |
| 6,173,990 B1 * | 1/2001 | Nakajima et al. | 280/730.2 |
| 6,189,917 B1 | 2/2001 | Tschaeschke | |
| 6,231,071 B1 | 5/2001 | Keane | |
| 6,234,517 B1 * | 5/2001 | Miyahara et al. | 280/730.2 |
| 6,305,707 B1 | 10/2001 | Ishiyama et al. | |
| 6,460,877 B1 * | 10/2002 | Tanabe et al. | 280/729 |
| 6,705,636 B1 * | 3/2004 | Takahara | 280/728.2 |
| 6,719,321 B1 | 4/2004 | Yasuhara et al. | |

FOREIGN PATENT DOCUMENTS

| | | |
|---|---|---|
| DE | 198 12 737 A 1 | 5/1999 |
| EP | 0 903 269 A1 | 3/1999 |

(Continued)

*Primary Examiner*—Faye M. Fleming
(74) *Attorney, Agent, or Firm*—Oliff & Berridge, PLC

(57) ABSTRACT

In a window air bag system in which an air bag (10) designed to be inflated into the shape of a curtain in a lateral region of a passenger compartment by being supplied with gas from an inflator (22) is stored in a folded state along a pillar portion (32) and a roof side rail (31). A hollow energy-absorbing member (51, 52) is disposed along a longitudinal direction of the p portion (32) and the roof side rail (31) in such a manner as to be contiguous to a position where the air bag (10) is stored state between the pillar portion (32) and pillar garnish (42) for covering the pillar portion (32) and between the roof side a side rail garnish (41) for covering the roof side rail (31). The direction of deployment of the air bag (10) can thus be st reducing the amount of the garnish (42, 41) protruding into the passenger compartment, spaciousness of the passenger compartment, good visibility, and considerable ease with which a passenger can get on and off the vehicle can be guaranteed.

9 Claims, 5 Drawing Sheets

FOREIGN PATENT DOCUMENTS

| | | |
|---|---|---|
| JP | A-10-166988 | 6/1998 |
| JP | A-11-321533 | 11/1999 |
| JP | A-2000-033845 | 2/2000 |
| JP | A-2000-272488 | 10/2000 |
| JP | A-2001-114061 | 4/2001 |
| JP | A-2002-220024 | 8/2002 |
| JP | A-2002-225658 | 8/2002 |
| JP | A-2002-362289 | 12/2002 |

* cited by examiner

WINDOW AIR BAG SYSTEM AND METHOD OF MOUNTING THE SAME

BACKGROUND OF THE INVENTION

1. Field of the Invention

The invention relates to a window air bag system installed in a vehicle and a method of mounting the same.

2. Description of the Related Art

In a window air bag system as an example of the related art, an air bag designed to be inflated into the shape of a curtain in a lateral region of a passenger compartment by being supplied with gas from an inflator is stored in a folded state along a pillar portion and a roof side rail portion (an upper edge of a door opening of a vehicle body). For example, JP(A) 3052085 discloses such a window air bag system.

In the window air bag system disclosed in JP(A) 3052085 described above, a multitude of sheet ribs functioning as energy-absorbing members are integrally formed on a back surface of an A-pillar garnish (i.e., an inner surface of a front pillar garnish). The sheet ribs are located behind the folded air bag, and a passage for assisting deployment of the air bag is formed between the sheet ribs and the A-pillar (the front pillar). Each of the sheet ribs facing the passage has a curved surface that is not squarish but smooth.

In the window air bag system disclosed in JP(A) 3052085 described above, the multitude of sheet ribs are disposed in the longitudinal direction of the A-pillar at intervals of a predetermined distance. Thus, while the air bag is being deployed, it is likely to be trapped by the sheet ribs. That is, the direction of deployment of the air bag cannot be stabilized easily. Also, the sheet ribs require a long stroke to ensure desired energy-absorption performance, and the passage for assisting deployment of the air bag constitutes an idle-running stroke (a stroke that does not contribute to the absorption of energy). Thus, in order to achieve desired energy-absorption performance in the sheet ribs, the sheet ribs must be enlarged so that the A-pillar garnish protrudes considerably into the passenger compartment. If the A-pillar protrudes considerably into the passenger compartment, disadvantages in the availability of a space in the passenger compartment, visibility, and the degree of ease with which a passenger can get on and off the vehicle are caused.

SUMMARY OF THE INVENTION

The invention has been made in quest of a solution to the aforementioned problems. In a window air bag system according to one aspect of the invention, an air bag designed to be inflated into the shape of a curtain in a lateral region of a passenger compartment by being supplied with gas from an inflator is stored in a folded state along structural member of a vehicle body such as a pillar portion and a roof side rail. This window air bag system is characterized in that a hollow energy-absorbing member is disposed along a longitudinal direction of the structural member between the structural member and a garnish for covering the structural member in such a manner as to be contiguous to a position where the air bag is stored in a folded state between the structural member and the garnish.

In the window air bag system according to the invention, if the inflator supplies the air bag stored in a folded state with gas as soon as a suitable sensor detects an acceleration equal to or higher than a set value in case of emergency such as side collision or rollover of the vehicle, the air bag is inflated into the shape of a curtain in the lateral region of the passenger compartment. As the air bag is inflated, the portion of the air bag stored in a folded state between the structural member and the garnish is ejected from the garnish into the passenger compartment through a gap between an end portion of the garnish and the structural member.

In the invention, the energy-absorbing member that is disposed contiguous to the portion of the air bag stored in a folded state between the structural member and the garnish is a hollow member disposed along the longitudinal direction of the structural member, and is provided with a wall surface extending continuously along the longitudinal direction of the structural member. Thus, when the air bag is deployed, the portion of the air bag is unlikely to be trapped by the energy-absorbing member. As a result, the direction of deployment of the air bag can be stabilized easily.

In the invention, the energy-absorbing member is disposed between the structural member and the garnish. Thus, even if the head of a passenger hits the garnish in case of collision of the vehicle or the like, the energy-absorbing member performs its function and softens an impact on the head of the passenger. Because the energy-absorbing member adopted in the invention is hollow and demonstrates higher energy-absorption efficiency than the sheet ribs according to the related art, desired energy-absorption performance can be achieved with a confined volume (a confined space). By reducing the amount of the garnish protruding into the passenger compartment, it becomes possible to ensure spaciousness of the passenger compartment, good visibility, and considerable ease with which a passenger can get on and off the vehicle.

According to a further aspect of the invention, it is also preferable that a guide surface for guiding a direction of deployment of the portion of the air bag stored in a folded state be formed on one lateral surface of the energy-absorbing member.

If the guide surface for guiding a direction of deployment of the air bag stored in a folded state is formed on one lateral surface of the energy-absorbing member as described above, deployment of the air bag can be guided by making use of the guide surface of the energy-absorbing member. That is, the air bag can be controlled stably in such a manner as to be deployed in a predetermined direction, without the necessity of providing the air bag with an additional component.

According to a further aspect of the invention, it is also preferable that the portion of the air bag stored in a folded state in a pillar portion be disposed substantially parallel to the guide surface or in such a direction as to intersect with the guide surface.

If the portion of the air bag stored in a folded state in a pillar portion is disposed substantially parallel to the guide surface or in such a direction as to intersect with the guide surface as described above, the direction of deployment of the air bag can be adjusted easily by setting an angle of inclination of the guide surface or an angle of intersection between the air bag and the guide surface appropriately.

According to a further aspect of the invention, it is also preferable that the portion of the air bag stored in a folded state in a pillar portion be disposed apart from the guide surface or in contact with the guide surface.

If the portion of the air bag stored in a folded state in a pillar portion is disposed apart from the guide surface or in contact with the guide surface as described above, the direction of deployment of the air bag can be adjusted easily by setting a gap between the guide surface and the air bag appropriately.

According to a further aspect of the invention, it is also preferable that the pillar portion be an A-pillar or a C-pillar and that the portion of the air bag be made from a base cloth having no inflatable portion.

If the pillar portion is an A-pillar or a C-pillar and the portion of the air bag is made from a base cloth having no inflatable portion as described above, the portion (made from the base cloth having no inflatable portion) of the air bag stored in a folded state between the A-pillar portion or the C-pillar portion and the pillar garnish passes through the gap between the end portion of the pillar garnish and the A-pillar portion or the C-pillar portion, as the air bag is inflated. Even if the gap is narrow, the portion of the air bag can pass through it easily and quickly. Consequently, the time required until completion of deployment of the air bag can be reduced.

In a window air bag system according to another aspect of the invention, a hollow energy-absorbing member is disposed along a longitudinal direction of a roof side rail in a portion thereof which is located above an upper end portion of a B-pillar garnish and below the folded air bag, and that the energy-absorbing member is provided with a guide surface for ensuring deployment of the air bag into the passenger compartment.

In the window air bag system constructed as described above, the air bag designed to be inflated into the shape of a curtain in the lateral region of the passenger compartment by being supplied with gas from the inflator is disposed in a folded state along the pillar portion and the roof side rail portion. The hollow energy-absorbing member is disposed along the longitudinal direction of the roof side rail in the portion of the roof side rail which is located above the upper end portion of the B-pillar garnish and below the folded air bag. The energy-absorbing member is provided with the guide surface for ensuring deployment of the air bag into the passenger compartment. Thus, the guide surface of the energy-absorbing member ensures that the air bag is deployed into the passenger compartment. As a result, the air bag that is being deployed is prevented from being immersed in a gap between the B-pillar garnish and the B-pillar and from being trapped by the upper end portion of the B-pillar garnish.

The energy-absorbing member is disposed along the roof side rail. Thus, even if the head of a passenger hits the roof side rail above the B-pillar in case of collision of the vehicle or the like, the energy-absorbing member performs its function and softens an impact on the head of the passenger. Also, since the energy-absorbing member is hollow and demonstrates higher energy-absorption efficiency than the sheet ribs according to the related art, desired energy-absorption performance can be achieved with a confined volume (a confined space). By reducing the amount of the pillar garnish protruding into the passenger compartment, it becomes possible to ensure spaciousness of the passenger compartment, good visibility, and considerable ease with which one can get on and off the vehicle.

According to a further aspect of the invention, it is also preferred that the guide surface be inclined with respect to a body-side mounting surface of the energy-absorbing member.

If the guide surface is inclined with respect to the body-side mounting surface of the energy-absorbing member as described above, the appropriate setting of the angle of inclination of the guide surface makes it possible to adjust the direction of deployment of the air bag body with ease and achieve the aforementioned effect (i.e., the effect of deploying the air bag body into the passenger compartment) optimally.

According to a further aspect of the invention, it is also preferred that each of the energy-absorbing members be a hollow member made from an extrudable metal or a hollow member made from paper and metal foil.

If each of the energy-absorbing members is a hollow member made from an extrudable metal or a hollow member made from paper and metal foil as described above, desired energy-absorption performance can thus be obtained with a confined volume, while weight saving of the energy-absorbing members is accomplished. In addition, the folded air bag and the energy-absorbing members can fit well into a confined space in the vehicle body.

In a method of mounting a window air bag system according to another aspect of the invention, an air bag designed to be inflated into the shape of a curtain in a lateral region of a passenger compartment by being supplied with gas from an inflator is stored in a folded state along a structual member of a vehicle body such as a pillar portion and a roof side rail. First of all, hollow energy-absorbing members are mounted along a longitudinal direction of the roof side rail and the pillar portion. The air bag is then mounted to the vehicle body after the energy-absorbing members have been mounted to the vehicle body. In implementing the invention, the energy-absorbing members are mounted to the vehicle body before the air bag is mounted to the vehicle body.

According to the method as described above, since the energy-absorbing members are mounted to the vehicle body before the air bag is mounted to the vehicle body, the air bag can be mounted to the vehicle body by reference to the positions of the energy-absorbing members that have been mounted to the vehicle body beforehand. As a result, the operation of mounting the air bag to the vehicle body can be performed more efficiently.

BRIEF DESCRIPTION OF THE DRAWINGS

The above and other objects, features, advantages, and technical and industrial significance of this invention will be better understood by reading the following detailed description of exemplary embodiments of the invention, when considered in connection with the accompanying drawings, in which.

DETAILED DESCRIPIION OF PREFERRED EMBODIMENTS

In the following description and the accompanying drawings, the invention will be described in more detail in terms of preferred embodiments.

Figure 1:
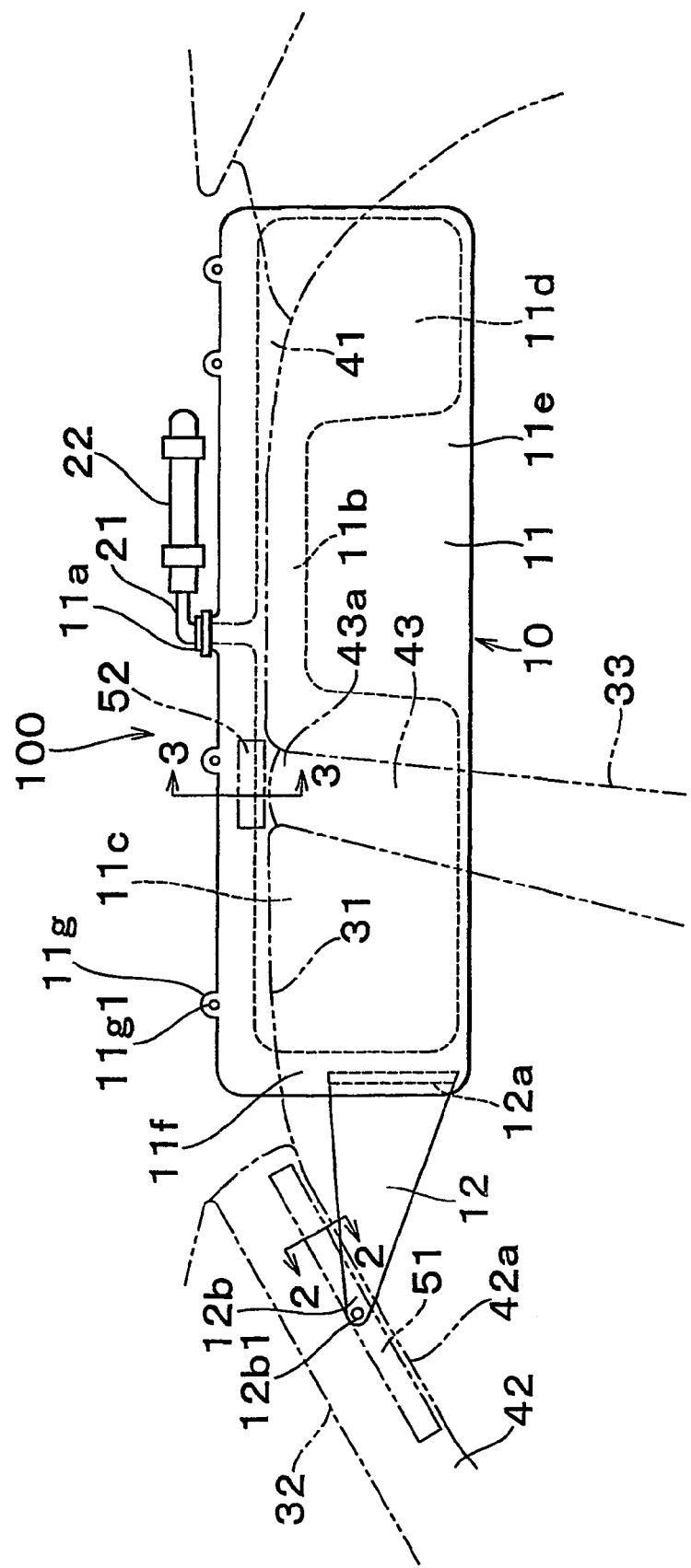
FIG. 1 is a schematic side view of a window air bag system according to one embodiment of the invention.
Figure 2:
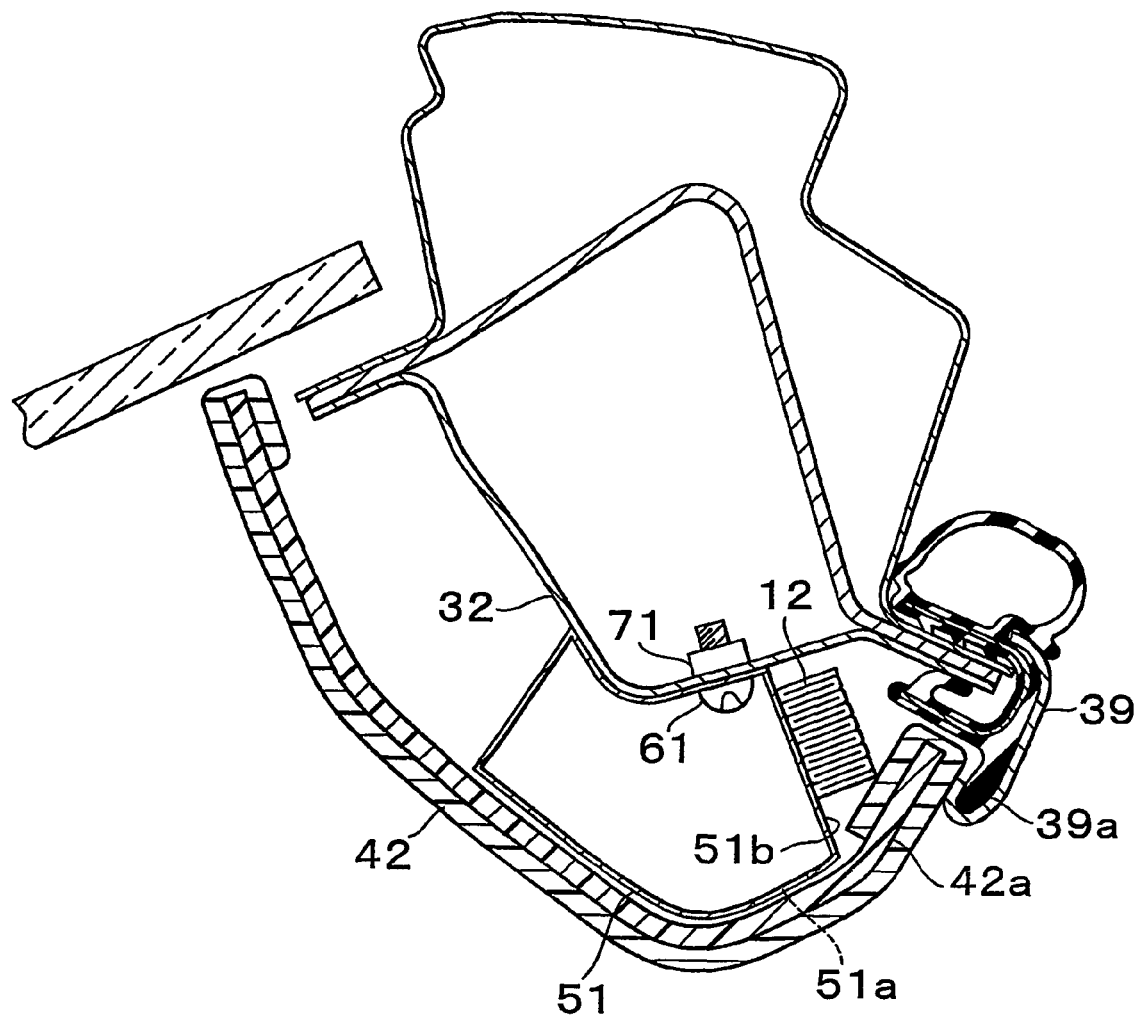
FIG. 2 is an enlarged cross-sectional view taken along a line 2—2 in FIG. 1 when an air bag has been stored.
Figure 3:
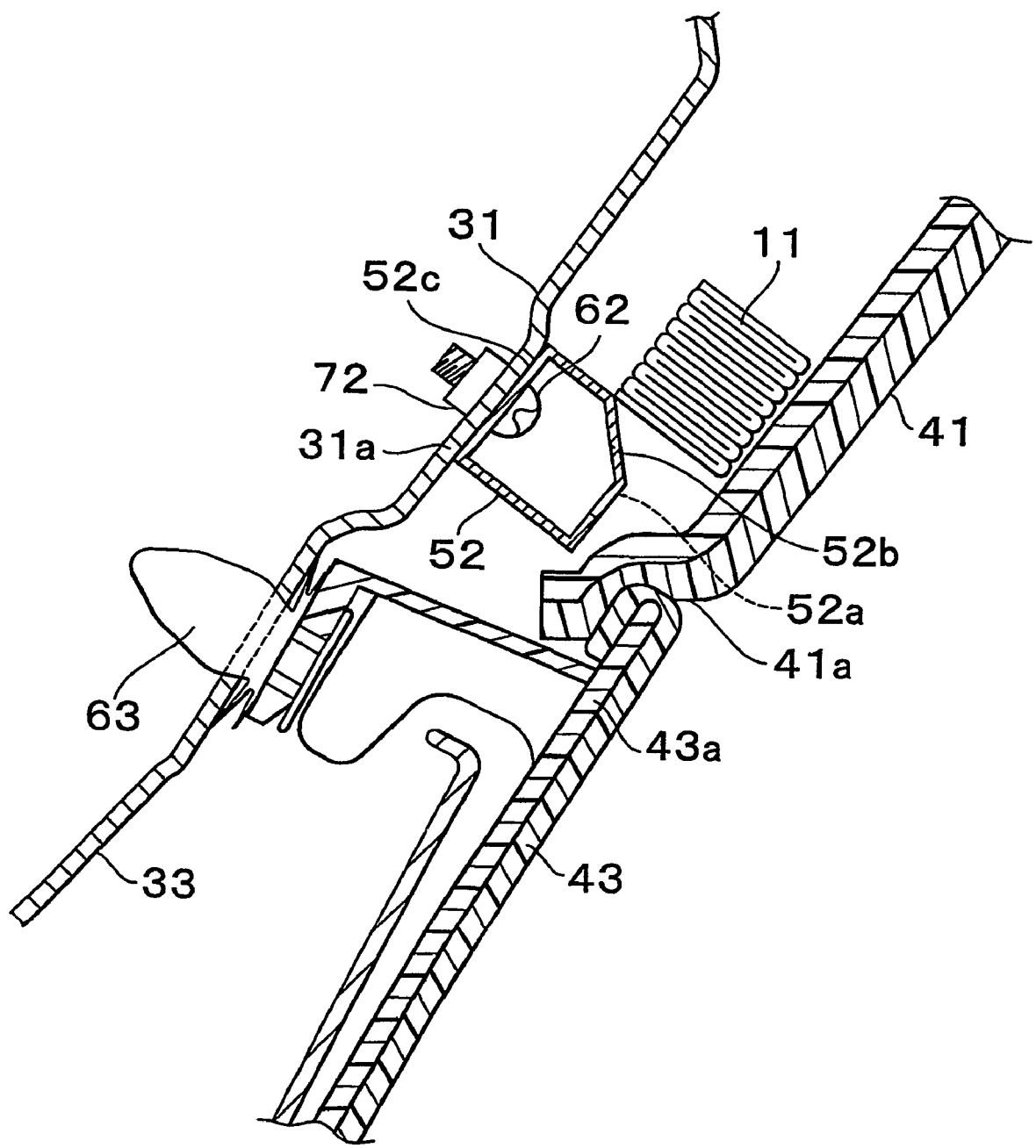
FIG. 3 is an enlarged cross-sectional view taken along a line 3—3 in FIG. 1 when the air bag has been stored.

FIGS. 1 to 3 show a window air bag system designed for a passenger vehicle according to the embodiment of the invention. A window air bag system 100 according to this embodiment has an air bag 10 and an inflator 22. The air bag 10 is disposed in a lateral region of a passenger compartment and is inflated into the shape of a curtain, thus protecting front-seat and rear-seat passengers (not shown) from head injury. The inflator 22 supplies the air bag 10 with gas through a diffuser pipe 21. The air bag 10 is composed of an air bag body 11 and a tension cloth 12. The air bag body 11 has an inflatable portion and a non-inflatable portion. The tension cloth 12, which has no inflatable portion, is attached to a front end portion of the air bag body 11.

The air bag body 11 is woven into the shape of a bag in such a manner that weave patterns extend both longitudinally and vertically. A coating material for guaranteeing airtightness is applied to the surface of the air bag body 11. The air bag body 11 has a gas supply port 11a, a gas passage 11b extending from a lower end of the gas supply port 11a longitudinally, that is, substantially in a direction perpendicular to the gas supply port 11a, a front-seat inflatable portion 11c and a rear-seat inflatable portion 11d communicating with each other through the gas passage 11b, an intermediate non-inflatable portion 11e, a front-end non-inflatable portion 11f, and four mounting strip portions 11g. Each of the mounting strip portions 11g has a mounting hole 11g1 so that the air bag body 11 can be mounted to a roof side rail 31.

The tension cloth 12 (constituting part of the air bag 10) has a triangular shape (which can be changed into another shape if necessary) and is made from a non-coated woven cloth (a base cloth with no inflatable portion), which is thinner and less expensive than a cloth constituting the air bag body 11. The tension cloth 12 is sewn at its rear end portion 12a to the front-end non-inflatable portion 11f. A front end portion 12b of the tension cloth 12 has a mounting hole 12b1 so that the tension cloth 12 can be fixed to an A-pillar 32 (see FIG. 1).

As shown in FIG. 3, after having been folded into the shape of bellows extending vertically, the air bag body 11 is stored along the roof side rail 31 in a space formed between the roof side rail 31 and a lateral peripheral portion of a roof head lining 41. As shown in FIG. 2, after having been folded into the shape of bellows, the tension cloth 12 is stored along the A-pillar 32 in a space formed between the A-pillar 32 and an A-pillar garnish 42, which is attached to the A-pillar 32 to cover it. The air bag body 11 and the tension cloth 12, which have been folded into the shape of bellows, are retained by socks or tapes (not shown), which are ruptured when the air bag 10 is inflated.

In this embodiment, as shown in FIGS. 1 and 2, a hollow energy-absorbing member 51 is disposed between the A-pillar 32 and the A-pillar garnish 42 in such a manner as to be contiguous to a position where the tension cloth 12 of the air bag 10 in a folded state is disposed. The energy-absorbing member 51 is disposed along the longitudinal direction of the A-pillar 32, and is fixed to the A-pillar 32 by means of a screw 61 inserted through an insertion hole 51a before the air bag 10 is mounted to a vehicle body. It is to be noted herein that the screw 61 is tightly screwed into a weld nut 71 that has been fixed to the A-pillar 32 beforehand.

The energy-absorbing member 51 is a hollow member made from an extrudable metal such as aluminum. As shown in FIG. 2, a guide surface 51b for defining a direction of deployment of the tension cloth 12 is formed on the vehicle exterior side (on the right). The guide surface 51b is flat and substantially parallel to a direction in which the folded tension cloth 12 is disposed. The vehicle interior side (on the left) of the folded tension cloth 12 is entirely in contact with the guide surface 51b. In this embodiment, as shown in FIGS. 1 and 3, a hollow energy-absorbing member 52 is disposed in a portion 31a of the roof side rail 31. This portion 31a is located below the folded air bag body 11 and above an upper end portion 43a of a B-pillar garnish 43, which is mounted to a B-pillar 33 by means of a clip 63 to cover it.

The energy-absorbing member 52 is disposed in the longitudinal direction of the roof side rail 31 for the sake of coordination with the B-pillar 33. The energy-absorbing member 52 is fixed to the roof side rail 31 by means of a screw 62 inserted through an insertion hole 52a, before the air bag 10 is installed in the vehicle body. It is to be noted herein that the screw 62 is screwed into a weld nut 72 that has been fixed to the roof side rail 31 in advance. As shown in FIG. 3, the energy-absorbing member 52 is disposed between an end portion (a lower end portion) 41a of the roof head lining 41 and the roof side rail 31, thus preventing the end portion 41a of the roof head lining 41 from moving toward the outside of the vehicle.

The energy-absorbing member 52 is a hollow member made from an extrudable metal such as aluminum. As shown in FIG. 3, a guide surface 52b for ensuring that the air bag body 11 is deployed into the passenger compartment is formed in an upper region inside the vehicle. The guide surface 52b is inclined with respect to a body-side mounting surface 52c of the energy-absorbing member 52. A lower end portion of the folded air bag body 11 on the vehicle exterior side is in contact with an upper end portion of the guide surface 52b.

In this embodiment constructed as described above, if the gas supply port 11a of the air bag body 11 of the air bag 10 stored in a folded state is supplied with gas from the inflator 22 through the diffuser pipe 21 as soon as a suitable sensor (not shown) detects an acceleration equal to or higher than a set value in case of emergency such as side collision or rollover of the vehicle, the air bag 10 is deployed as shown in FIG. 1 as the front-seat inflatable portion 11c and the rear-seat inflatable portion 11d of the air bag body 11 are inflated by the supplied gas. The air bag 10 is eventually inflated into the shape of a curtain in the lateral region of the passenger compartment.

In this case, as the air bag body 11 is inflated, the tension cloth 12 of the air bag 10 stored in a folded state between the A-pillar 32 and the A-pillar garnish 42 is ejected into the passenger compartment from the A-pillar garnish 42 through a gap between a rear end portion 42a of the A-pillar garnish 42 and the A-pillar 32. Because the rear end portion 42a of the A-pillar garnish 42 is acutely curved into the passenger compartment when the tension cloth 12 is ejected into the passenger compartment, a tongue portion 39a of a weather strip 39 fitted to the end of the A-pillar 32 is disengaged from the rear end portion 42a of the A-pillar garnish 42, whereby an opening through which the tension cloth 12 can pass is formed.

In this embodiment, the energy-absorbing member 51 disposed contiguous to the tension cloth 12 stored in a folded state between the A-pillar 32 and the A-pillar garnish 42 is a hollow member disposed in the longitudinal direction of the A-pillar 32. The energy-absorbing member 51 is a guide surface (a smooth wall surface made from extruded metal with a low sliding resistance) 51b, which extends continuously along the longitudinal direction of the A-pillar 32. Thus, the tension cloth 12 is unlikely to be trapped by the energy-absorbing member 51 during deployment of the air bag 10. That is, the direction of deployment of the air bag 10 is stabilized easily.

In this embodiment, the energy-absorbing member 51 is disposed between the A-pillar 32 and the A-pillar garnish 42 along the longitudinal direction of the A-pillar 32. Therefore, even if the head of a passenger hits the A-pillar garnish 42 in case of collision of the vehicle or the like, the energy-absorbing member 51 performs its function through plastic deformation and softens an impact on the head of the passenger.

The energy-absorbing member 51 employed in the A-pillar 32 according to this embodiment is hollow and demonstrates higher energy-absorption efficiency than the sheet ribs according to the related art, thus making it possible to achieve desired energy-absorption performance with a confined volume (a confined space). By reducing the amount of the A-pillar garnish 42 protruding into the passenger compartment, it becomes possible to ensure spaciousness of the passenger compartment, good visibility, and considerable ease with which a passenger can get on and off the vehicle.

In this embodiment, the guide surface 51b is formed on one lateral surface of the energy-absorbing member 51 so as to define the direction of deployment of the tension cloth 12 stored in a folded state. The direction of deployment of the air bag 10 can thus be guided by making use of the guide surface 51b of the energy-absorbing member 51. As a result, the air bag 10 can be stably controlled such that deployment occurs in a predetermined direction, without the necessity of providing the air bag 10 with any additional component.

In this embodiment, the tension cloth 12 stored in a folded state is disposed substantially parallel to the guide surface 51b of the energy-absorbing member 51, and is in contact with the guide surface 51b of the energy-absorbing member 51 as shown in FIG. 2. The direction of deployment of the air bag 10 can thus be adjusted easily by setting an angle of inclination of the guide surface 51b appropriately.

In this embodiment, the tension cloth 12 is made from a base cloth having no inflatable portion. As the air bag 10 is inflated, the tension cloth 12 stored in a folded state between the A-pillar 32 and the A-pillar garnish 42 passes through the gap between the end portion 42a of the A-pillar garnish 42 and the A-pillar 32 (more specifically, through the opening formed between the tongue portion 39a of the weather strip 39 and the end portion 42a of the A-pillar garnish 42 as a result of acute curvature of the end portion 42a of the A-pillar garnish 42 into the passenger compartment). Even if the gap is narrow, the tension cloth 12 can pass through it easily and quickly. Consequently, the time required until completion of deployment of the air bag 10 can be reduced.

In this embodiment, as shown in FIG. 3, the hollow energy-absorbing member 52 is disposed along the longitudinal direction of the roof side rail 31 in the portion 31a, which is located above the upper end portion 43a of the B-pillar garnish 43 and below the folded air bag body 11. The energy-absorbing member 52 has the guide surface 52b for ensuring deployment of the air bag body 11 into the passenger compartment.

Hence, the guide surface 52b of the energy-absorbing member 52 ensures that the air bag body 11 is deployed into the passenger compartment. Thus, the air bag body 11 that is being deployed is prevented from being immersed in a gap between the B-pillar garnish 43 and the B-pillar 33 and from being trapped by the upper end portion 43a of the B-pillar garnish 43. When the air bag body 11 is deployed, the end portion (the lower end portion) 41a of the roof head lining 41 is acutely curved into the passenger compartment, whereby the opening is formed between the end portion 41a of the roof head lining 41 and the upper end portion 43a of the B-pillar garnish 43. The air bag body 11 passes through the opening.

In this embodiment, the energy-absorbing member 52 is disposed along the roof side rail 31. Thus, even if the head of a passenger hits the portion 31a (whose rigidity has been enhanced by the B-pillar 33) of the roof side rail 31 above the B-pillar 33 during collision of the vehicle or the like, the energy-absorbing member 52 performs its function as a result of plastic deformation and softens an impact on the head of the passenger. The energy-absorbing member 52 employed in the roof side rail 31 according to this embodiment is hollow and demonstrates high energy-absorption efficiency, thus making it possible to achieve desired energy-absorption performance with a confined volume (a confined space). By reducing the amount of the roof head lining 41 and the B-pillar garnish 43 protruding into the passenger compartment, it becomes possible to ensure spaciousness of the passenger compartment, good visibility, and considerable ease with which the passenger can get on and off the vehicle.

In this embodiment, the energy-absorbing member 52 has the guide surface 52b inclined with respect to the body-side mounting surface 52c. Thus, if the angle of inclination of the guide surface 52b is set appropriately, it becomes possible to adjust the direction of deployment of the air bag body 11 with ease and achieve the aforementioned effect (i.e., the effect of deploying the air bag body 11 into the passenger compartment) optimally.

In this embodiment, each of the energy-absorbing members 51, 52 is designed as a hollow member made from an extrudable metal (e.g., aluminum). Desired energy-absorption performance can thus be obtained with a confined volume, while weight saving of the energy-absorbing members 51, 52 is accomplished. In addition, the folded air bag 10 and the energy-absorbing members 51, 52 can fit well into a confined space in the vehicle body.

In this embodiment, the energy-absorbing members 51, 52 are mounted to the vehicle body before the air bag 10 is mounted to the vehicle body. The air bag 10 (the folded air bag body 11 and the tension cloth 12) can thus be mounted to the vehicle body by reference to the positions of the energy-absorbing members 51, 52 that have been mounted to the vehicle body beforehand. As a result, the operation of mounting the air bag 10 to the vehicle body can be performed more efficiently.

Figure 4:
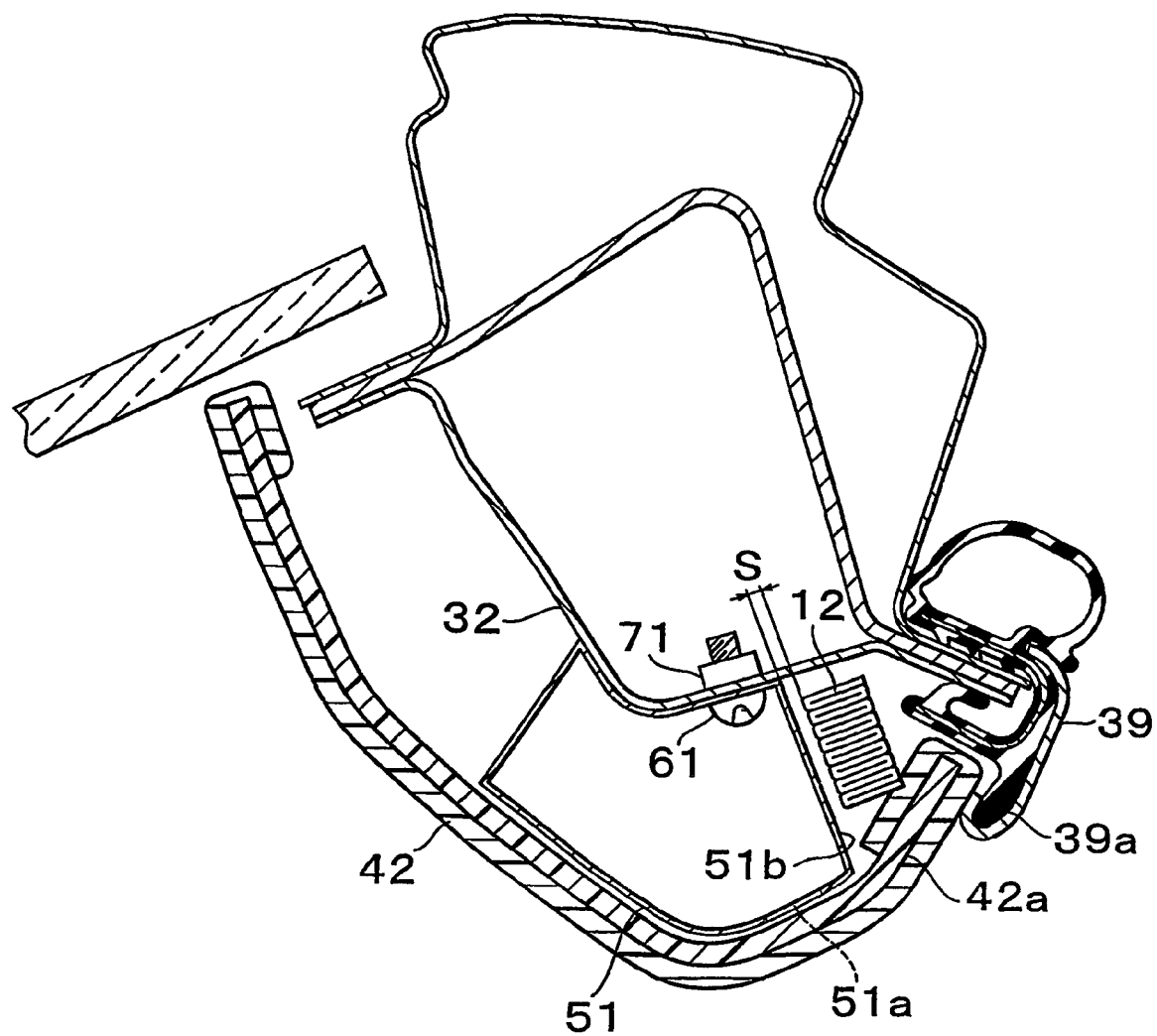
FIG. 4 is an enlarged cross-sectional view of a section shown in FIG. 2 according to a modified embodiment of the invention.

In the aforementioned embodiment, as shown in FIG. 2, the tension cloth 12 stored in a folded state is in contact with the guide surface 51b of the energy-absorbing member 51. However, the tension cloth 12 stored in a folded state may also be disposed apart from the guide surface 51b of the energy-absorbing member 51 as shown in FIG. 4. In this case, the direction of deployment of the air bag 10 can be adjusted easily by setting a gap S between the guide surface 51b and the tension cloth 12 appropriately.

Figure 5:
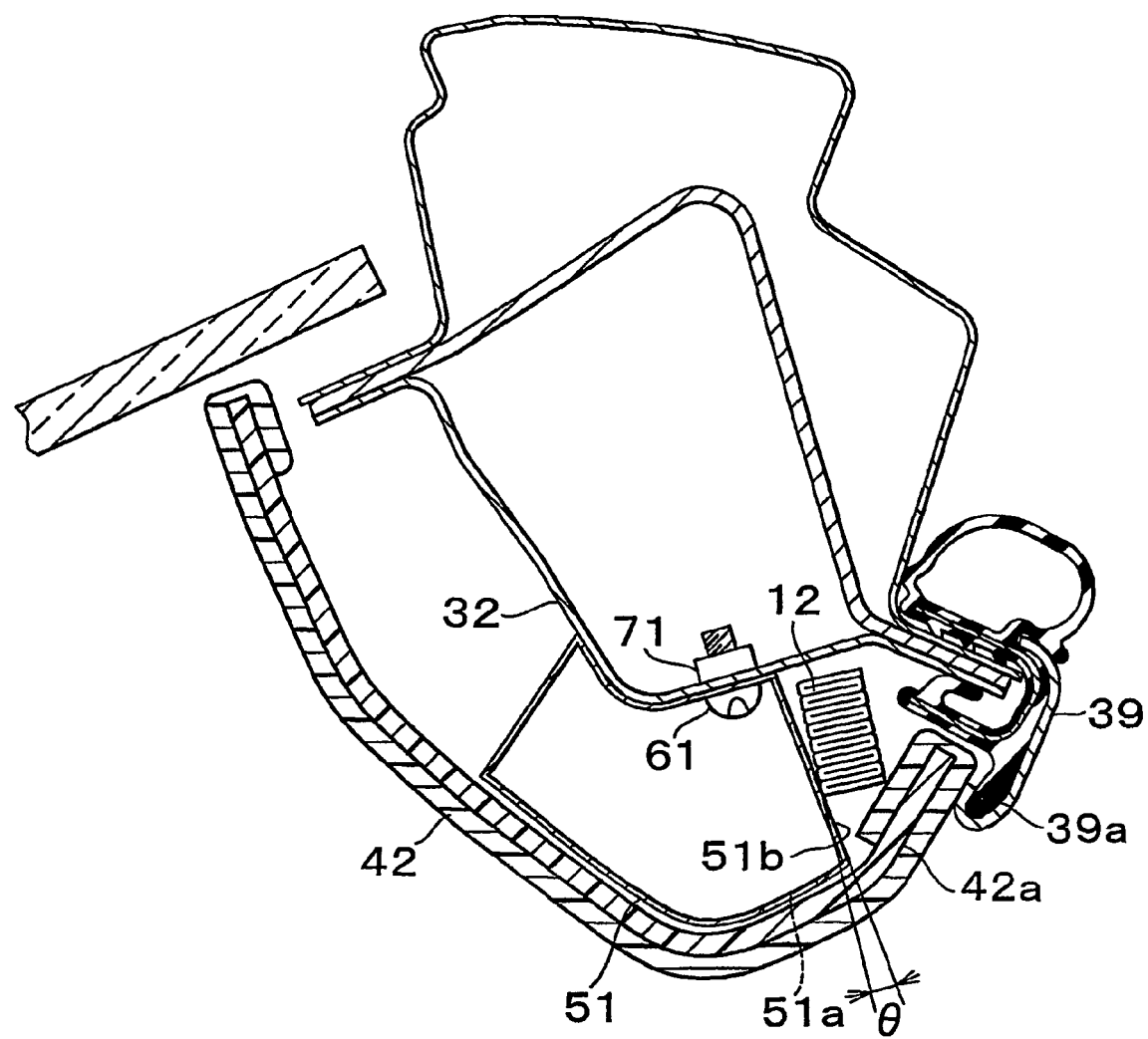
FIG. 5 is an enlarged cross-sectional view of the section shown in FIG. 2 according to another modified embodiment of the invention.

In the aforementioned embodiment, as shown in FIG. 2, the tension cloth 12 stored in a folded state is disposed substantially parallel to the guide surface 51b of the energy-absorbing member 51. However, the tension cloth 12 stored in a folded state may also be disposed in such a direction as to form a predetermined angle θ with the guide surface 51b of the energy-absorbing member 51 as shown in FIG. 5. In this case, the direction of deployment of the air bag 10 can be adjusted easily by setting the angle θ formed between the tension cloth 12 and the guide surface 51b appropriately.

In the aforementioned embodiment, each of the energy-absorbing members 51, 52 is designed as a hollow member made from an extrudable metal (e.g., aluminum). However, each of the energy-absorbing members 51, 52 may also be designed as a hollow member composed of paper and metal foil (e.g., iron foil or aluminum foil) as disclosed in Japanese Patent Laid-Open No. 2000-272448.

In the aforementioned embodiment, the air bag body 11 is manufactured by weaving a cloth into the shape of a bag. However, a bag manufactured by sewing or gluing (hot-welding) pieces of a cloth together can also be employed as the air bag 10. In the aforementioned embodiment, the invention is applied to the window air bag system in which the air bag 10 is composed of the air bag body 11 and the tension cloth 12 fitted to the front end portion of the air bag body 11. However, the invention is also applicable to a window air bag system in which an air bag is constructed differently. For example, the air bag may be composed of an air bag body with inflatable and non-inflatable portions and front and rear tension cloths with no inflatable portions, and the front and rear tension cloths are fitted to is front and rear end portions of the air bag body respectively. In this case, the construction adopted in the region of the A-pillar in the aforementioned embodiment is adopted in the regions of the A-pillar and the C-pillar.

In the aforementioned embodiment, the invention is applied to the window air bag system in which gas from the inflator 22 is supplied from the center of the air bag body 11. However, the invention is also applicable to a window air bag system in which gas from an inflator is supplied, for example, from behind an air bag.

In the inventive window air bag system in which an air bag designed to be inflated into the shape of a curtain in a lateral region of a passenger compartment by being supplied with gas from an inflator is stored in a folded state along a pillar portion and a roof side rail. A hollow energy-absorbing member is disposed along a longitudinal direction of the pillar portion and the roof side rail in such a manner as to be contiguous to a position where the air bag is stored in a folded state between the pillar portion and a pillar garnish for covering the pillar portion and between the roof side rail and a side rail garnish for covering the roof side rail. The direction of deployment of the air bag can thus be stabilized. By reducing the amount of the garnish protruding into the passenger compartment, spaciousness of the passenger compartment, good visibility, and considerable ease with which a passenger can get on and off the vehicle can be guaranteed.

While the invention has been described with reference to the preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A window air bag system, comprising:
   an air bag which is stored in a folded state along a pillar portion of a vehicle body and a roof side rail and is designed to be inflated into the shape of a curtain in a lateral region of a passenger compartment by being supplied with gas from an inflator; and
   a hollow energy-absorbing member which is disposed along a longitudinal direction of the pillar portion between the pillar portion and a garnish for covering the pillar portion in such a manner as to be contiguous to a position where the air bag is stored in a folded state between the pillar portion and the garnish,
   wherein the pillar portion is an A-pillar or a C-pillar and a portion of the air bag stored in a folded state in the pillar portion is made from a base cloth having no inflatable portion, such that said portion is able to pass through a gap between said pillar and a pillar garnish easily and quickly so as to reduce the time required until completion of deployment of the air bag;
   wherein a guide surface for guiding the air bag during deployment of the air bag is formed on one lateral surface of the energy-absorbing member; and
   wherein said portion of the air bag stored in a folded state in said pillar portion is disposed substantially parallel to the guide surface.

2. The window air bag system according to claim 1, wherein
   the portion of the air bag stored in a folded state in said pillar portion is disposed in such a direction as to intersect with the guide surface.

3. The window air bag system according to claim 1, wherein
   the portion of the air bag stored in a folded state in said pillar portion is disposed apart from the guide surface.

4. The window air bag system according to claim 1, wherein
   the portion of the air bag stored in a folded state in said pillar portion is disposed in contact with the guide surface.

5. The window air bag system according to claim 1, wherein
   the guide surface is inclined with respect to a body-side mounting surface of the energy-absorbing member.

6. The window air bag system according to claim 1, wherein
   the energy-absorbing member is a hollow member made from an extrudable metal or a hollow member made from paper and metal foil.

7. A method of mounting a window air bag system in which an air bag designed to be inflated into the shape of a curtain in a lateral region of a passenger compartment by being supplied with gas from an inflator is stored in a folded state along a pillar portion of a vehicle body, comprising the steps of:
   fitting hollow energy-absorbing members along a longitudinal direction of the pillar portion of the vehicle body; and
   fitting the air bag to the vehicle body after the energy-absorbing members have been fitted to the vehicle body; and
   storing a portion of the air bag in a folded state in the pillar portion, said portion of the air bag made from a base cloth having no inflatable portion, such that said portion of the air bag is able to pass through a gap between said pillar portion and a pillar garnish easily and quickly so as to reduce the time required until completion of deployment of the air bag.

8. The window air bag system according to claim 1, wherein:
   the hollow energy-absorbing member is disposed on a portion of the roof side rail above an upper end portion of a B-pillar garnish and below the folded air bag;
   the energy-absorbing member is provided with a guide surface for ensuring deployment of the air bag into the passenger compartment; and
   the guide surface is inclined with respect to a body-side mounting surface of the energy-absorbing member.

9. The method of claim 5, wherein:

fitting the hollow energy-absorbing members along the longitudinal direction of the pillar portion of the vehicle body comprises fitting at least one of the hollow energy-absorbing members on a portion of a roof side rail above an upper end portion of a B-pillar garnish and below the folded air bag; and the method further comprises:

providing the energy-absorbing member with a guide surface for ensuring deployment of the air bag into the passenger compartment; and inclining the guide surface with respect to a body-side mounting surface of the energy-absorbing member.

* * * * *